United States Patent [19]

Wang

[11] 4,002,500

[45] Jan. 11, 1977

[54] THERMOCOUPLE EXTENSION WIRE

[75] Inventor: Teh Po Wang, North Caldwell, N.J.

[73] Assignee: W. B. Driver Company, Newark, N.J.

[22] Filed: July 31, 1975

[21] Appl. No.: 600,282

Related U.S. Application Data

[63] Continuation-in-part of Ser. No. 129,460, March 30, 1971, abandoned, which is a continuation-in-part of Ser. No. 822,786, April 1, 1969, abandoned.

[52] U.S. Cl. .............................. 136/241; 136/227; 136/236 R
[51] Int. Cl.² ................................. H01L 35/20
[58] Field of Search ............... 136/241, 227, 236 R; 75/153, 159, 160, 161

[56] References Cited

UNITED STATES PATENTS

| | | | |
|---|---|---|---|
| 1,468,456 | 9/1923 | Bristol | 136/241 X |
| 2,183,592 | 12/1939 | Silliman | 75/153 |
| 2,224,573 | 12/1940 | Hunter | 75/153 |
| 2,335,707 | 11/1943 | Streicher | 136/241 X |
| 3,337,371 | 8/1967 | Agafonov et al. | 75/159 |
| 3,372,062 | 3/1968 | Zysk | 136/227 |

*Primary Examiner*—Leland A. Sebastian
*Attorney, Agent, or Firm*—Norman J. O'Malley; John C. Fox; Donald R. Castle

[57] ABSTRACT

A thermocouple extension wire composition comprising, as expressed in percent by weight, nickel 0.5% – 1.5%; manganese 0.25% – 0.4%; balance copper.

A pair of thermocouple extension wires, one wire having the above composition, the other wire being composed essentially of copper, exhibit a differential electromotive force substantially equal to the electromotive force developed by a thermocouple using noble metals principally of platinum between 32° F to 400° F.

3 Claims, 2 Drawing Figures

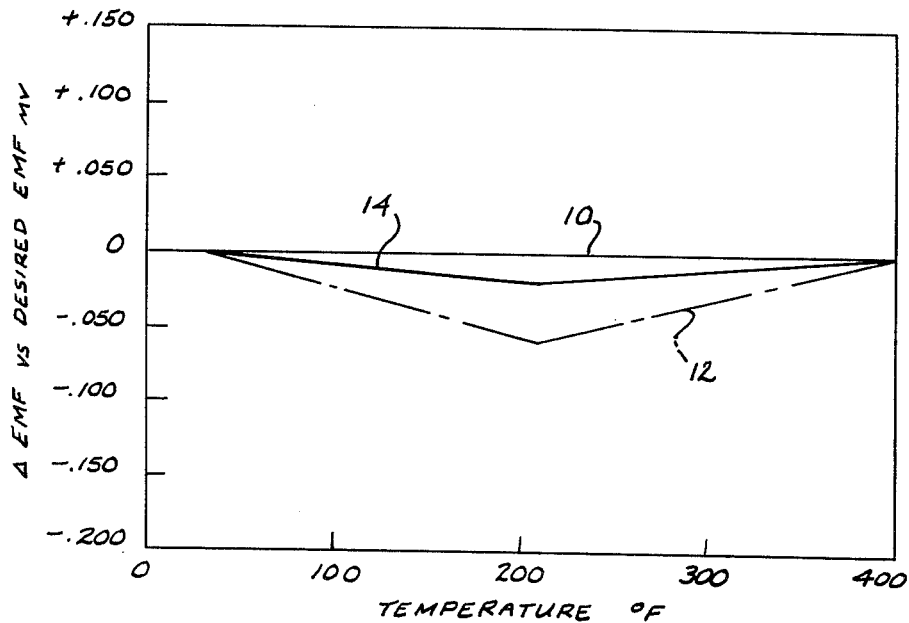
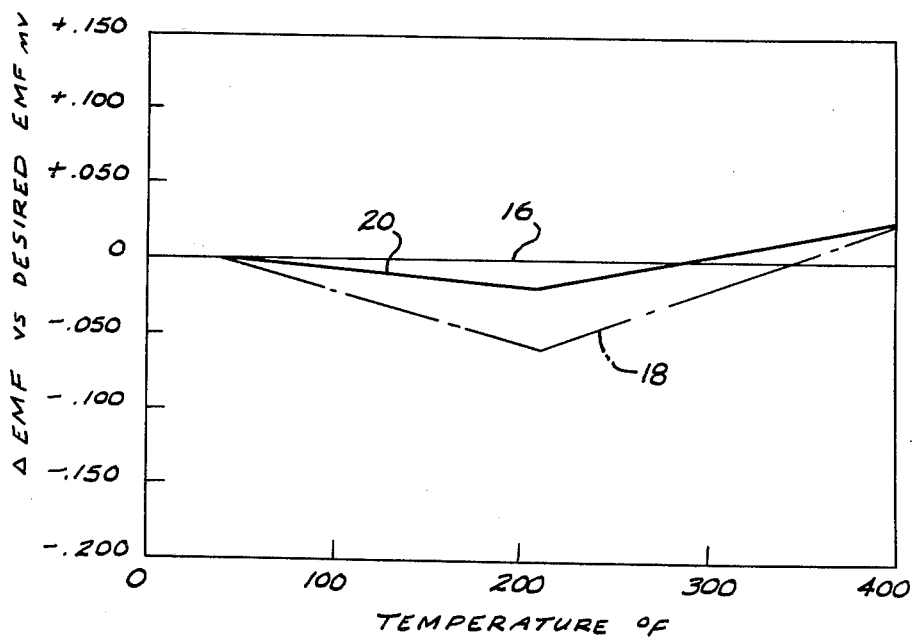

THERMOCOUPLE EXTENSION WIRE

CROSS REFERENCE TO RELATED APPLICATION

This application is a continuation-in-part of application Ser. No. 129,460, filed Mar. 30, 1971, now abandoned which was a continuation-in-part of Ser. No. 822,786, filed Apr. 1, 1969 and now abandoned. Ser. No. 423,267, filed Dec. 10, 1973, now U.S. Pat. 3,926,681, is a continuation of Ser. No. 293,063, filed Sept. 28, 1972, now abandoned, which was a division of Ser. No. 129,460 now abandoned.

BACKGROUND OF THE INVENTION

Thermocouples using noble metals are commonly employed in high temperature measurement and control, particularly for temperatures of 2000° F and higher. Typically, such thermocouples use platinum as negative thermoelement and an alloy of platinum and rhodium as the positive thermoelement. Two different alloy compositions are normally used; the first contains 13% rhodium, balance platinum, and the second contains 10% rhodium, balance platinum. A thermocouple using platinum as the negative thermoelement together with a positive thermoelement having the first composition is known as a Type R thermocouple. When the second composition is substituted for the first composition, the resultant thermocouple is known as a Type S thermocouple.

Thermocouples are usually spaced from the measurement or control instrumentation by distances which can be six feet or more, and thus thermocouple extension wires (or extension wires) are used to connect the thermocouples to the instrumentation. Because of the high cost of platinum, these extension wires to the platinum thermocouples are composed of less expensive metals or alloys.

It is well known to use as extension wires, for both Type R and Type S thermocouples, a copper wire as the positive thermo-couple extension (or lead) wire and a copper-nickel alloy wire, known as PCLW (platinum compensating lead wire) as the negative thermocouple extension wire. This last named alloy contains about 0.75% nickel, balance copper.

In the normal installation, the thermocouples are connected to a header junction, and the extension wires are connected between the header junction and the instrumentation. In most industrial applications, the temperature of the header junction will not exceed 400° F while the temperature at the instrumentation will not fall below 32° F.

Ideally, to avoid inaccuracy, the extension wires and a noble thermocouple should have matched thermoelectric characteristics at which the differential electromotive force (EMF) developed between the two extension wires should be equal, both in polarity and magnitude, to the differential EMF developed between the two thermocouple wires at any temperature within the range 32° F to 400° F.

I have found that the use of copper-nickel alloy wire as a negative thermocouple extension wire together with a copper wire as the positive thermocouple extension wire does not provide an ideal match.

In my invention, I employ a new alloy composition for the negative extension wire which, when used together with a copper wire as the positive extension, produces a much better match not only for Type S thermocouples but for Type R thermocouples as well.

SUMMARY OF THE INVENTION

In accordance with my invention, a negative thermocouple extension wire comprises, as expressed in percent by weight, 0.5%–1.5% nickel, 0.25% – 0.40% manganese, balance copper. Small amounts of deoxidizers selected from the class consisting of boron magnesium and silicon can be added to this composition.

The differential EMF between a copper wire used as the positive thermocouple extension wire and my composition as the negative thermocouple extension wire, as measured over the temperature range 32° F to 400° F is substantially matched with the EMF's generated by both Type S and Type R thermocouples.

BRIEF DESCRIPTION OF THE DRAWINGS

In the drawing:

FIG. 1 is a graph showing the match between the differential EMF's of my invention and a Type S couple as a function of temperature in comparison with the existing copper-nickel alloy; and FIG. 2 is a similar graph showing the match between the differential EMF's of my invention and a Type R couple as a function of temperature in comparison with the existing copper-nickel alloy.

DETAILED DESCRIPTION OF THE PREFERRED EMBODIMENTS

My negative extension wire composition comprises 0.5 – 1.5% nickel, 0.25 – 0.40% manganese, balance copper. An illustrative composition is 1% nickel, 0.3% manganese, balance copper which can also contain 0.03 to 0.05% silicon, 0.02 to 0.04% magnesium or 0.01% boron.

It has been discovered that by keeping the manganese content within the range of from 0.25 to 0.40% that the close balance is maintained between the copper wire as a positive extension wire when these are used in conjunction with the beforedescribed Type R and Type S thermocouples. Increasing the manganese content above the 0.25 to 0.40% range introduces a mismatch of a magnitude sufficient that no benefits are derived over use of the copper-nickel alloy. It is believed that the new copper base alloy having from 0.25 to 0.40% manganese and 0.5 to 1.5% nickel constitutes an advancement in the art. A range of from 0.75 to 1.25% of nickel is preferred.

Referring now to FIG. 1, curve 10 which is a straight horizontal line represents the ideal or zero EMF difference between a Type S thermocouple and a pair of extension wires. The dotted curve shown at 12 represents the actual match (measured difference between the thermocouple pair and the extension wire pair) obtained when the positive extension wire is copper and the negtive extension wire if 0.75% nickel, balance copper. The solid curve shown at 14 represents the actual match obtained in the same manner as in curve 12 with a wire having my composition substituted for the nickel-copper alloy wire described above.

FIG. 2 shows a similar group of curves. Curve 16 is a straight horizontal line representing the ideal match between a Type R thermocouple and a pair of extension wires. The dotted curve shown at 18 represents the actual match obtained where the positive extension wire is copper and the negative extension wire is 0.75% nickel, balance copper. The solid curve shown at 20 represents the actual match obtained in the same manner as curve 18 with a wire having my composition substituted for the nickelcopper alloy wire described above.

From FIGS. 1 and 2, it will be seen that a substantial improvement in matching both the Type S and the Type R couples is obtained through the use of my invention.

Data is presented in the following Table I comparing the EMF of various thermocouple elements and extension wire elements vs. a standard platinum 27 wire element.

TABLE I

|  | EMF vs Pt 27, μv | |
| --- | --- | --- |
|  | 212° F | 400° F |
| Copper (positive extension wire) | +.760 | +1.886 |
| Pt/10Rh (Type S) (positive thermoelement) | +.643 | +1.474 |
| Desired EMF of PCLW* for Type S | +.117 | + .412 |
| Pt/13Rh (Type R) (Positive thermoelement) | +.645 | +1.504 |
| Desired EMF of PCLW for Type R | +.115 | + .382 |
| Binary Cu/Ni PCLW Alloys |  |  |
| Cu/.25 Ni | +.491 | +1.243 |
| Cu/.71 Ni | +.018 | + .415 |
| Cu/.76 Ni | +.060 | + .390 |
| Cu/.78 Ni | +.054 | + .318 |
| Ternary Cu/Ni/Mn PCLW Alloys |  |  |
| Cu/1.02Ni/.30Mn | +.093 | + .413 |
| Cu/1.00Ni/.31Mn | +.094 | + .405 |
| Cu/1.01Ni/.32Mn | +.091 | + .381 |

*PCLW is the "Platinum Compensated Lead Wire", that is, the negative extension wire.

As may be seen from the Table, EMF vs. platinum 27 in microvolts is presented for two different temperatures, 212° F and 400° F respectively, for a number of different materials. In order to arrive at the desired EMF value of the negative extension wire (PCLW) for a Type R or Type S thermocouple alloy system, the EMF of both the copper positive extension wire and the platinum rhodium positive thermoelement of the thermocouple were measured. Since the negative thermoelement (leg) of the thermocouple is platinum the desired EMF of the negative extension wire is equal to the difference in EMF of the positive thermoelement and the positive extension wire. These are the values presented for Type S thermocouples at line 3 of the Table and for Type R thermocouples at line 5 of the Table. These are the values against which subsequent values in the Table are compared since they represent a theoretically perfect match between the thermocouple and extension wire pairs. The next set of data in the Table shows the EMF values for the binary copper nickel PCLW alloys of the prior art as nickel content varies from 0.25 to 0.78 weight percent. As may be seen, the best match, that is the values which compare most favorably with the desired values, are those for 0.76 percent nickel alloy. This is approximately the composition against which Applicant's alloy composition containing 1.0 percent nickel and 0.3 percent manganese was compared in FIGS. 1 and 2. The next set of data shows Applicant's alloy composition containing from 1 to 1.02 weight percent nickel and from 0.3 to 0.32 weight percent manganese. The improved match over the prior art alloy composition at both 212° F and 400° F is apparent. The values presented in Table I were obtained by coupling each of the leg wires and each of the extension wires in turn to a common reference leg of Standard Platinum 27 and EMF readings taken.

The values in Table I, in having been arrived at by comparison to Standard Platinum 27, are not directly comparable to those presented in FIGS. 1 and 2 of the application, since the values in FIGS. 1 and 2 are the measured differences in EMF between the thermocouple pair and the extension wire pair. Nevertheless both Table I and FIGS. 1 and 2 clearly establish the improved match of Applicant's extension wire pair to the thermocouple pair over the prior art system.

While there has been shown and described what are at present considered the preferred embodiments of the invention, it will be obvious to those skilled in the art that various changes and modifications may be made therein without departing from the scope of the invention as defined by the appended claims.

What is claimed is:

1. A negative thermocouple extension wire composition for use with a positive copper thermocouple extension wire in a Platinum/Platinum-Rhodium thermocouple system wherein the positive thermoelement of the system is a Platinum-Rhodium alloy selected from the group consisting of Platinum-10 percent Rhodium and Platinum-13 percent Rhodium, the composition consisting essentially of in percent by weight:

| Nickel | 0.5–1.5% |
| --- | --- |
| Manganese | 0.25–0.40%; and |
| Copper | Balance |

2. The composition of claim 1 further including small additions of deoxidizers selected from the group consisting of 0.01% boron, 0.02 to 0.04% magnesium, and 0.03 to 0.05% silicon.

3. The composition of claim 2 wherein the nickel content is from 0.75 to 1.25% by weight.

* * * * *